(12) United States Patent
Nishiguchi et al.

(10) Patent No.: US 10,219,239 B2
(45) Date of Patent: Feb. 26, 2019

(54) INFORMATION PROCESSING SYSTEM, INFORMATION PROCESSING METHOD, AND MOBILE TERMINAL

(71) Applicant: FUJITSU LIMITED, Kawasaki-shi, Kanagawa (JP)

(72) Inventors: Naoki Nishiguchi, Kawasaki (JP); Tatsuro Matsumoto, Yokohama (JP); Takashi Ohno, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/918,203

(22) Filed: Mar. 12, 2018

(65) Prior Publication Data

US 2018/0279248 A1 Sep. 27, 2018

(30) Foreign Application Priority Data

Mar. 21, 2017 (JP) .................................. 2017-054080

(51) Int. Cl.
*H04W 24/00* (2009.01)
*H04W 60/00* (2009.01)
*H04W 64/00* (2009.01)
*H04W 8/18* (2009.01)
*H04W 4/50* (2018.01)
*H04M 1/725* (2006.01)
*H04W 88/02* (2009.01)

(52) U.S. Cl.
CPC ........... *H04W 60/005* (2013.01); *H04W 4/50* (2018.02); *H04W 8/183* (2013.01); *H04W 64/006* (2013.01); *H04M 1/72519* (2013.01); *H04M 1/72522* (2013.01); *H04W 88/02* (2013.01)

(58) Field of Classification Search
USPC ................................ 455/456.3, 550.1, 412.1
See application file for complete search history.

(56) References Cited

U.S. PATENT DOCUMENTS

| | | | | |
|---|---|---|---|---|
| 2007/0191034 A1* | 8/2007 | Lee | ......................... | H04L 51/38 455/466 |
| 2009/0305645 A1* | 12/2009 | Watanabe | ............... | H04W 4/12 455/73 |
| 2010/0174775 A1* | 7/2010 | Saiki | ........................ | H04L 67/06 709/203 |
| 2010/0180331 A1* | 7/2010 | Murakami | .............. | G06F 21/55 726/11 |
| 2011/0035436 A1* | 2/2011 | Takase | .................... | G06F 9/546 709/203 |
| 2011/0302657 A1* | 12/2011 | Ikegami | ................. | G06F 21/577 726/25 |

(Continued)

FOREIGN PATENT DOCUMENTS

| | | |
|---|---|---|
| JP | 2007-201921 | 8/2007 |
| JP | 2008-11038 | 1/2008 |
| JP | 2009-17217 | 1/2009 |

*Primary Examiner* — Danh C Le
(74) *Attorney, Agent, or Firm* — Staas & Halsey LLP

(57) ABSTRACT

An information processing system configured to identify a detection target based on first identification information having a limit on number of registrations in an operating system of a first mobile terminal and second identification information that does not have the limit, the information processing system includes the first mobile terminal, the detection target, and an information processing apparatus.

15 Claims, 19 Drawing Sheets

(56) References Cited

U.S. PATENT DOCUMENTS

| | | | | |
|---|---|---|---|---|
| 2012/0236854 A1* | 9/2012 | Takagishi | ......... | H04L 29/12377 |
| | | | | 370/389 |
| 2014/0313353 A1* | 10/2014 | Echigo | .................. | H04N 5/232 |
| | | | | 348/207.11 |
| 2015/0078169 A1* | 3/2015 | Sonoda | ................... | H04L 47/32 |
| | | | | 370/236 |
| 2015/0127708 A1* | 5/2015 | Quinlan | .................. | H04L 67/10 |
| | | | | 709/201 |
| 2016/0029991 A1* | 2/2016 | Tajima | ................ | A61B 6/5294 |
| | | | | 378/98 |
| 2016/0055503 A1* | 2/2016 | Chan | ................. | G06Q 30/0205 |
| | | | | 705/7.34 |
| 2016/0072717 A1* | 3/2016 | Ansari | .................... | H04L 45/24 |
| | | | | 370/412 |
| 2016/0125467 A1* | 5/2016 | Scott | ..................... | H04W 4/043 |
| | | | | 705/14.58 |
| 2016/0173318 A1* | 6/2016 | Ha | ......................... | H04W 4/08 |
| | | | | 709/223 |
| 2017/0041759 A1* | 2/2017 | Gantert | ................ | H04W 64/00 |
| 2017/0078899 A1* | 3/2017 | Li | ....................... | H04W 64/006 |
| 2017/0117455 A1* | 4/2017 | Kim | ........................ | H01L 43/10 |
| 2017/0244830 A1* | 8/2017 | Cardonha | ......... | H04M 1/72577 |
| 2017/0272915 A1* | 9/2017 | Honda | .................. | H04W 4/029 |

\* cited by examiner

SHIFT FROM DETECTION TO NON-DETECTION

CHANGE HANDLING RULE

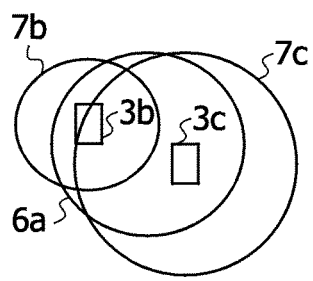
FIG. 17A
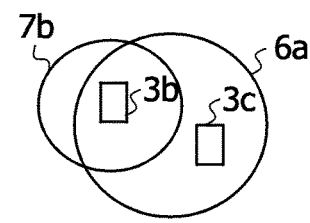
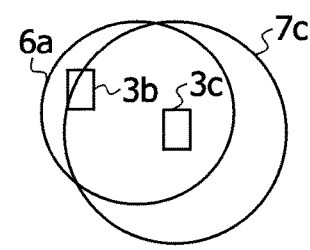
FIG. 17B

INFORMATION PROCESSING SYSTEM, INFORMATION PROCESSING METHOD, AND MOBILE TERMINAL

CROSS-REFERENCE TO RELATED APPLICATION

This application is based upon and claims the benefit of priority of the prior Japanese Patent Application No. 2017-54080, filed on Mar. 21, 2017, the entire contents of which are incorporated herein by reference.

FIELD

The embodiments discussed herein are related to an information processing system, an information processing method, and a mobile terminal.

BACKGROUND

Along with popularization of mobile terminals that can perform wireless data communications, provision of services using identification information of the mobile terminals are being developed. For example, an owner of a restaurant installs a beacon in its own restaurant, and the identification information is transmitted from the beacon at a fixed interval. When a user of the mobile terminal approaches the restaurant, the user receives the identification information transmitted from the beacon. The mobile terminal can obtain coupon information of the restaurant based on the identification information received from the beacon.

In order that the mobile terminal specifies a detection target such as the beacon corresponding to the detected identification information, a list of the identification information of the detection targets associated with the identification information to be specified can be previously registered in the mobile terminal. Since the detection target has the unique identification information, when the mobile terminal collates the detected identification information with the list of the identification information previously registered in itself, it is possible to specify the detection target corresponding to the detected identification information. For example, Japanese Laid-open Patent Publication No. 2008-011038 proposes a technology in which grouping of mobile terminals that can perform short-range communications with its own mobile terminal is performed, and only its own mobile terminal in the group is enabled to communicate with a server.

Japanese Laid-open Patent Publication No. 2009-017217 and Japanese Laid-open Patent Publication No. 2007-201921 also discuss related art technologies.

SUMMARY

According to an aspect of the invention, an information processing system includes an information processing apparatus, a first mobile terminal configured to be operated by an operating system (OS) that gives limit of number of registrations to first identification information, including a first memory configured to store notification information including eleventh identification information unique to a first detection target corresponding to part of the first identification information, twelfth identification information unique to a second detection target corresponding to part of the first identification information, thirteenth identification information common to the first detection target and the second detection target corresponding to part of the first identification information, twenty-first identification information unique to the first detection target corresponding to part of the second identification information, and first rule information for allocating detection of the eleventh identification information, which are received from the information processing system, and the eleventh identification information and the thirteenth identification information except for the twelfth identification information under limitation of the OS, and a processor coupled to the memory and configured to distribute the corresponding thirteenth identification information and the twenty-first identification information in a case where the eleventh identification information is detected based on the first rule information, and detect a detection target by the first identification information and second identification information that does not have the limit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 17A and 17B illustrate another exemplary embodiment in a case where a plurality of mobile terminals that can detect the detection target exist in an area of the detection target;

DESCRIPTION OF EMBODIMENTS

As the number of detection targets is increased, the number of pieces of identification information of detection targets to be registered in a mobile terminal is also increased. However, the number of pieces of identification information that can be registered in the mobile terminal may be limited by an operating system (OS) of the mobile terminal in some cases. For example, in a case where an attempt is made to register the identification information in a mobile terminal of a shopping mall user at once so that a plurality of beacons installed in a plurality of shops corresponding to tenants of the shopping mall can be detected, the identification information exceeds the number of pieces of identification information that can be registered in the mobile terminal. Thus, a problem occurs that a service prepared on the shopping mall side is not provided to the user.

A technology disclosed herein is aimed at detecting the number of the detection targets exceeding the number of pieces of identification information that can be registered in the mobile terminal.

Hereinafter, exemplary embodiments of the present disclosure will be specifically described.

First Exemplary Embodiment

Figure 1:
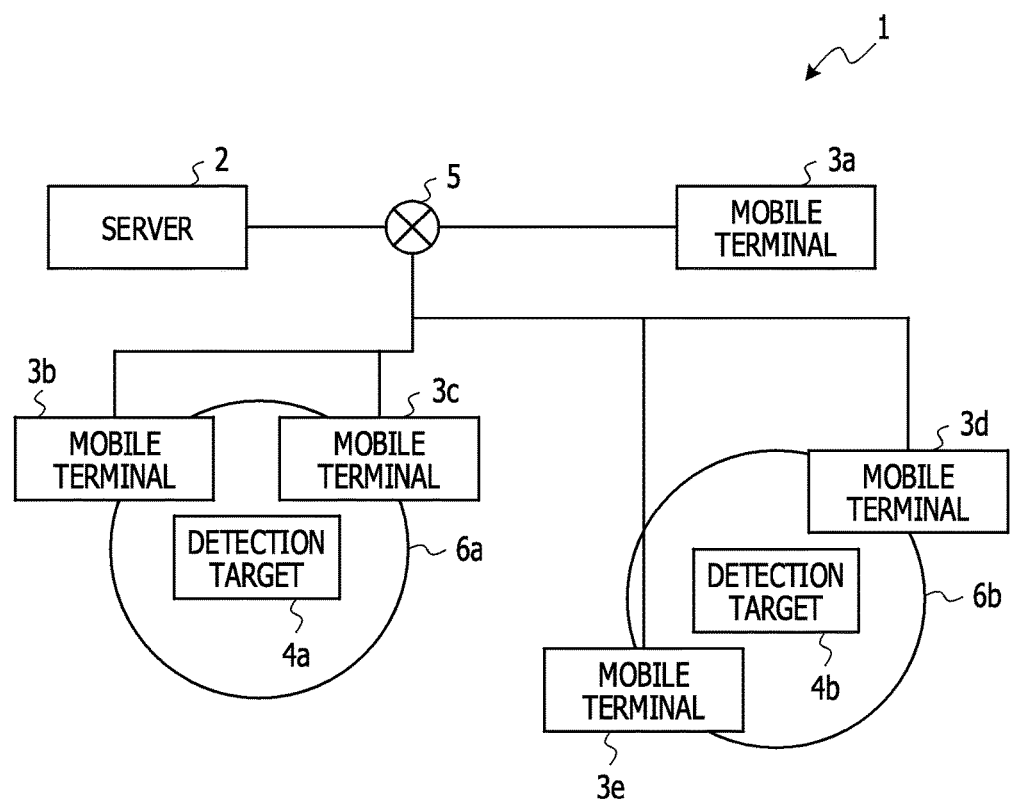
FIG. 1 illustrates an example of an identification information obtaining system according to a first exemplary embodiment.

FIG. 1 illustrates an example of an identification information obtaining system according to a first exemplary embodiment. An identification information obtaining system 1 in FIG. 1 includes a server 2, a mobile terminal 3 (hereinafter, which may be simply referred to as a terminal 3 in some cases), a detection target 4, and a network 5. The identification information obtaining system 1 is one of information processing systems in which identification information is processed and managed.

The server 2 manages the information of the terminal coupled to the network such as the identification information management for the identification information obtaining system 1 to function. The server 2 is, for example, a general-use computer. The mobile terminal 3 is a wireless terminal that can perform a data communication such as a mobile phone or a smart phone. The mobile terminal 3 includes mobile terminals 3a to 3e in the identification information obtaining system 1. The detection target 4 transmits position information and the like together with the unique identification information. The detection target 4 is, for example, a beacon that wirelessly transmits the beacon signal in which the information is previously set in a fixed cycle. The beacon signal includes, for example, the identification information for identifying the respective detection targets, installation position information indicating a position where the detection target is installed, a transmission time for the beacon signal, or the like. The detection target 4 may be a near field communication (NFC), a quick response (QR) code, Wi-Fi, or the like in addition to the beacon. As will be described below, a range where the signal transmitted from the detection target 4 can be received is defined as an area 6, but a range allocated for detecting a GPS signal may also be set as the detection target, for example. The detection of the detection target includes detection based on an acoustic wave or light in addition to the wireless detection.

The detection target 4 includes detection targets 4a and 4b in the identification information obtaining system 1. In FIG. 1, areas 6a and 6b are respectively ranges where beacon signals transmitted from the detection targets 4a and 4b can be received by the mobile terminals 3. In the case of FIG. 1, the mobile terminals 3b and 3c are located in the area 6a where the beacon signal transmitted from the detection target 4a can be received, and the mobile terminals 3d and 3e are located in the area 6b where the beacon signal transmitted from the detection target 4b can be received. The server 2 and the mobile terminal 3 are both coupled to the network 5 in a wired or wireless manner.

In the case of iBEACON, the identification information transmitted by the detection target 4 is obtained by assigning a major number or a minor number to a universally unique identifier (UUID) specified by an RFC 4122 specification, for example. Each of the detection targets 4 has a unique UUID. Since the mobile terminal 3 detects signals distributed by the detection targets 4, the identification information of the detection target 4 that is desired to be detected is to be registered in its own OS.

However, since the number of UUIDs that can be registered in its own OS by each of the mobile terminals 3 has a limit, the UUIDs of the respective detection targets 4 are replaced with localization information corresponding to the localized identification information according to the present exemplary embodiment. Herein, the localization refers to virtual allocation of a common UUID to the plurality of detection targets 4. Since the single UUID is allocated to the plurality of detection targets 4 by the localization, the mobile terminal 3 can register the localized identification of the respective detection targets 4 without being affected by the limit on the UUIDs that can be registered. Since the UUIDs are unified by the localization, the server 2 assigns a unique major number or minor major number as the localization information corresponding to the respective detection targets 4.

The mobile terminals 3 respectively obtain the identification information of the handling detection target 4 and the localization information of the respective detection targets 4 from the server 2. When the mobile terminal 3 enters the area 6 where the information transmitted from the handling detection target 4 can be received, the mobile terminal 3 obtains the identification information of the detection target 4. When the mobile terminal 3 enters the area 6 of the detection target 4 to which the mobile terminal 3 is allocated, the mobile terminal 3 notifies the server 2 that the allocated detection target 4 is detected.

When the server 2 receives the detection signal from the mobile terminal 3, the server 2 transmits an instruction signal for instructing the mobile terminal 3 to transmit the localization information. The mobile terminal 3 that has received the instruction signal from the server 2 starts transmission of the localization information. When another mobile terminal receives the localization information received from the mobile terminal 3, it is possible to virtually specify the installment position of the detection target 4 based on the localization information previously obtained from the server 2.

As described above, even when the identification information obtaining system 1 has the limit on the number of UUIDs that can be registered in the mobile terminal 3, it is possible to obtain the identification information based on the number of the detection targets 4 exceeding the limit number.

Figure 2:
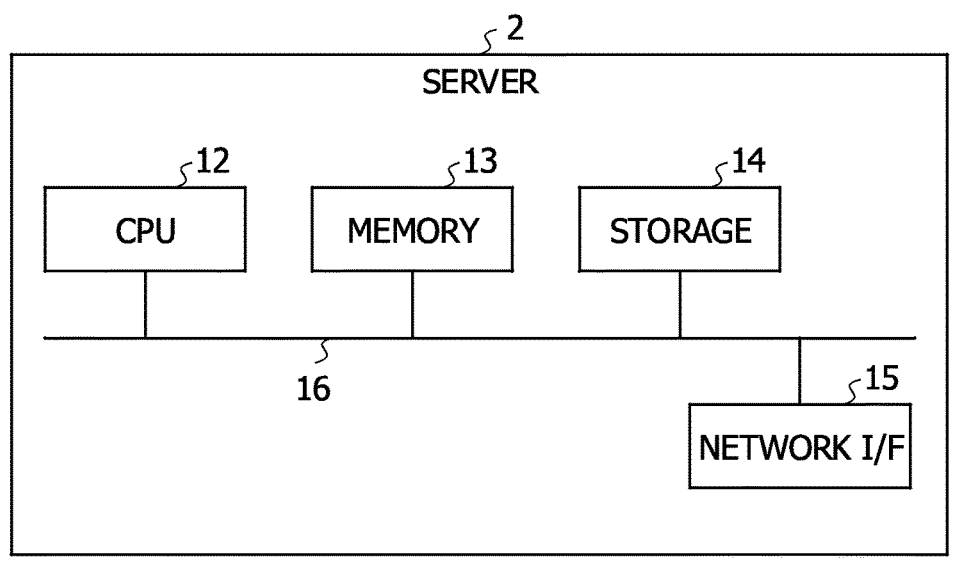
FIG. 2 is a hardware block diagram of a server.

FIG. 2 is a hardware block diagram of the server 2. The server 2 includes a central processing unit (CPU) 12, a memory 13, a storage 14, and a network interface (IF) 15. The CPU 12, the memory 13, the storage 14, and the network IF 15 are coupled to one another by a bus 16 and can perform data communications. The memory 13 and the storage 14 are both one of storage units that store information.

The CPU 12 reads out a software program stored in the storage 14 or the memory 13 to be executed. The memory 13 temporarily stores data read out from the storage 14, data received from the outside by the network IF 15, and the like. The storage 14 stores an operating system (OS), the software program, data referred to at the time of execution of the program, and the like. The network IF 15 performs data transmission and reception with another apparatus via the network 5.

Figure 3:
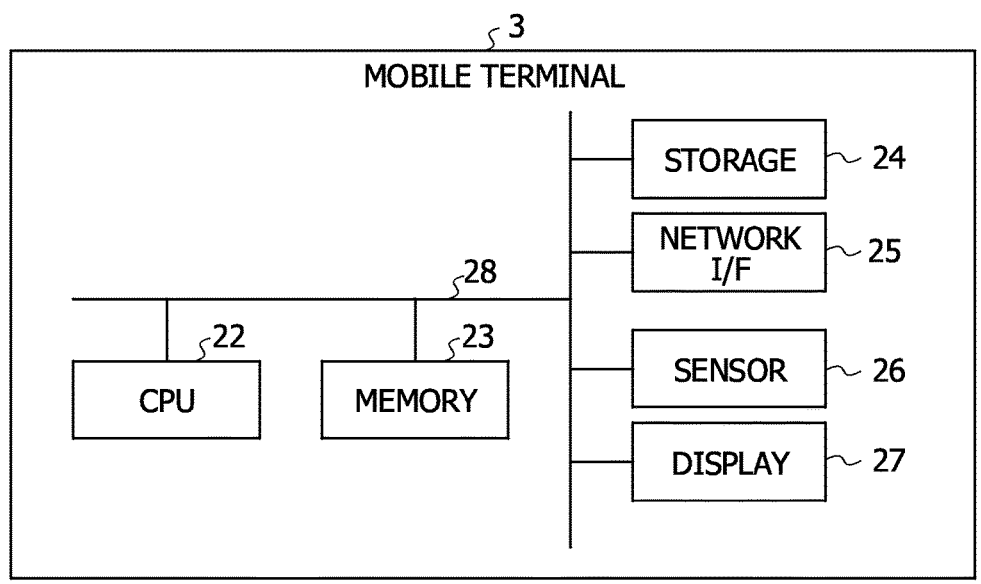
FIG. 3 is a hardware block diagram of a mobile terminal.

FIG. 3 is a hardware block diagram of the mobile terminal 3. The mobile terminal 3 includes a CPU 22, a memory 23, a storage 24, a network IF 25, a sensor 26, and a display 27. The CPU 22, the memory 23, the storage 24, the network IF 25, the sensor 26, and the display 27 are coupled to one another by a bus 28 and can perform data communications. The memory 23 and the storage 24 are respectively examples of a storage unit configured to store information.

The CPU 22 reads out a software program stored in the storage 24 or the memory 23 to be executed. The memory 23 temporarily stores data read out from the storage 24, data received from the outside by the network IF 25, and the like. The storage 24 stores an OS, the software program, data referred to at the time of execution of the program, and the like. The network IF 25 performs data transmission and reception with another apparatus via the network 5. The network IF 25 also functions as a distribution circuit that distributes the localization information which will be described below. The sensor 26 is, for example, an acceleration sensor that detects a movement of the mobile terminal 3 or a global positioning system (GPS) sensor. The display 27 displays signal detection information from the detection target 4, coupon information of a shop based on the identification information, and the like.

Figure 4:
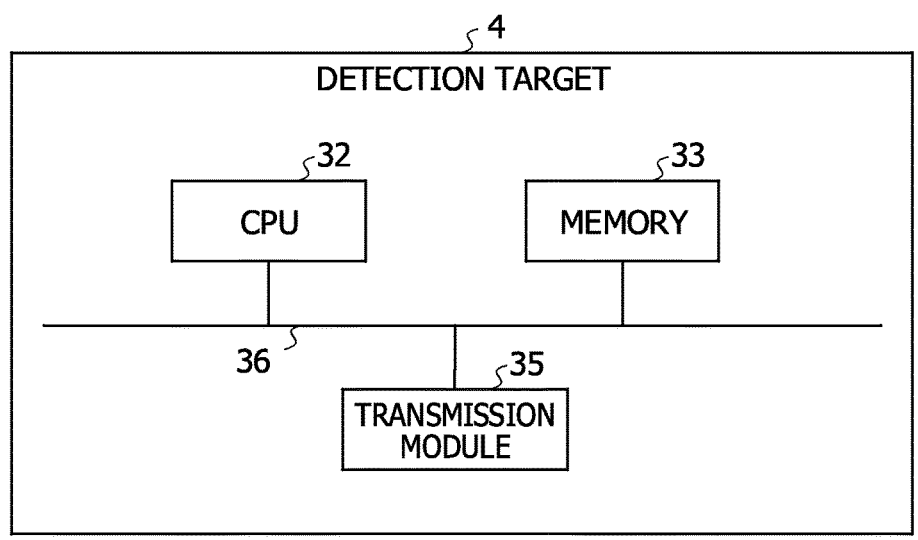
FIG. 4 is a hardware block diagram of a detection target.

FIG. 4 is a hardware block diagram of the detection target 4. The detection target 4 includes a CPU 32, a memory 33, and a transmission module 35. The CPU 32, the memory 33, and the transmission module 35 are coupled to one another by a bus 36 and can perform data communications. The memory 33 is one of storage units that store information.

The CPU 32 reads out a software program stored in the memory 33 to be executed. The memory 33 stores unique identification information of the detection target 4, installation position information, a software program, and the like. The transmission module 35 wirelessly transmits the information recorded in the memory 33.

Figure 5:
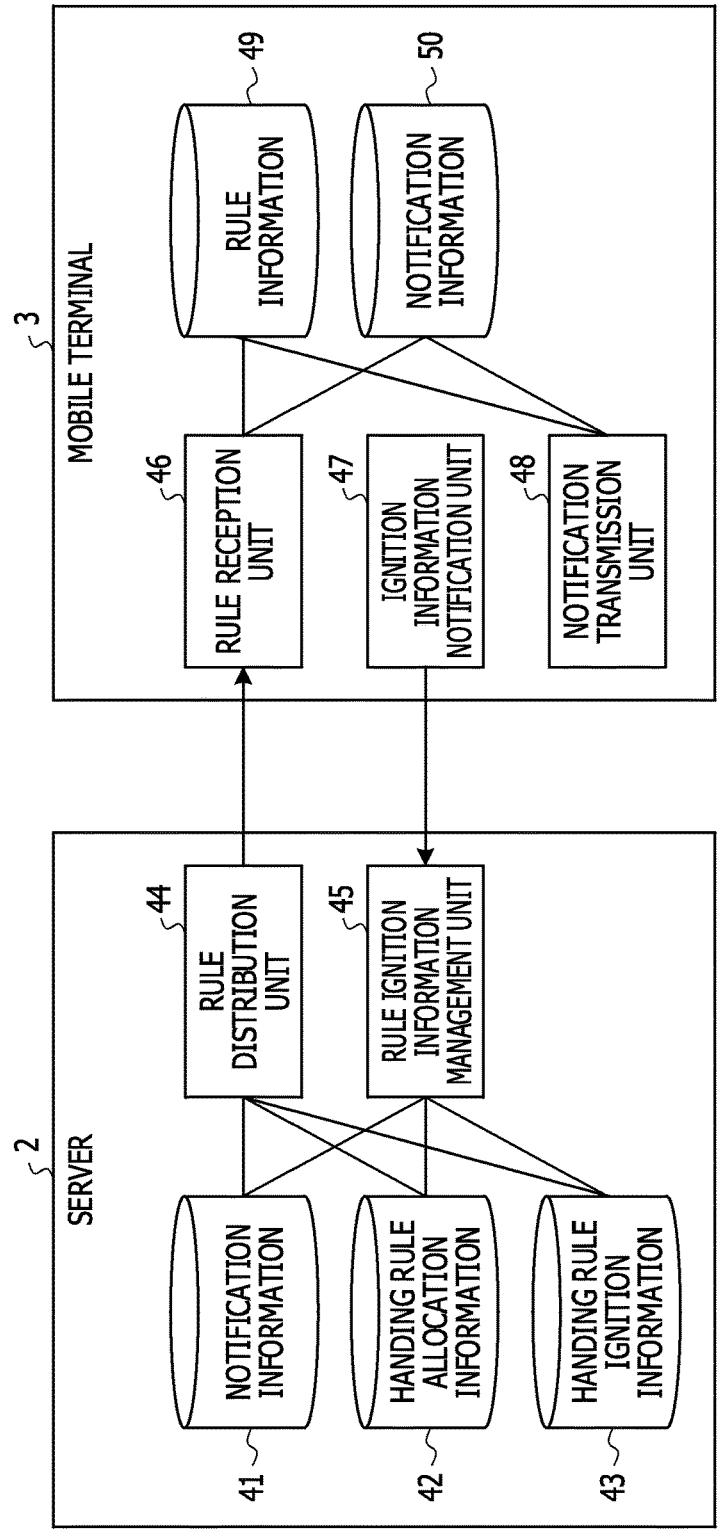
FIG. 5 is a function block diagram of the identification information obtaining system.

FIG. 5 is a function block diagram of the identification information obtaining system 1. The functions of the identification information obtaining system 1 are realized by the server 2 and the mobile terminal 3.

The server 2 includes notification information 41, handling rule allocation information 42, handling rule ignition information 43, a rule distribution unit 44, and a rule ignition information management unit 45 in the function block of the identification information obtaining system 1.

The notification information 41, the handling rule allocation information 42, and the handling rule ignition information 43 are stored in the memory 13 or the storage 14 in the server 2. The notification information 41 is information indicating a correspondence relationship between the unique identification information and the localization information for each of the detection targets 4. The handling rule allocation information 42 is information indicating which of the mobile terminals 3 allocated as the mobile terminal 3 handing the detection of which of the detection targets 4. The handling rule ignition information 43 is information indicating a situation where the respective mobile terminals 3 detect the detection target 4 or the other mobile terminal 3. Herein, the ignition refers to an occurrence of an previously expected event.

The rule distribution unit 44 and the rule ignition information management unit 45 are a function block realized when the CPU 12 executes the program stored in the memory 13 or the storage 14. The rule distribution unit 44 distributes the handling rule and the notification information 41 to the respective mobile terminals 3 based on the notification information 41, the handling rule allocation information 42, and the handling rule ignition information 43. The handling rule is for registering the detection target 4 set as the detection target in the OS of the mobile terminal 3 with respect to the mobile terminal 3. The rule ignition information management unit 45 updates the handling rule allocation information 42 and the handling rule ignition information 43 based on the ignition information received from the respective mobile terminals 3.

The server 2 can manage the localization information allocated to the respective detection targets 4 and the detection statuses of the detection targets 4 of the respective mobile terminals 3 as described above.

Each of the mobile terminals 3 include rule information 49, notification information 50, a rule reception unit 46, an ignition information notification unit 47, and notification transmission unit 48 in the function block of the identification information obtaining system 1.

The rule information 49 and the notification information 50 are stored in the memory 23 or the storage 24 in each of the mobile terminals 3. The rule information 49 is information related to the handling rule indicating that its own mobile terminal 3 handles the detection of which of the detection targets 4. The notification information 50 is obtained by storing the notification information 41 received from the server 2 in the memory 23 or the storage 24 of the mobile terminal 3.

The rule reception unit 46, the ignition information notification unit 47, and the notification transmission unit 48 are a function block realized when the CPU 22 executes the program stored in the memory 23 or the storage 24. The rule reception unit 46 updates the rule information 49 and the notification information 50 based on the notification information 41 received from the server 2 and the handling rule. The ignition information notification unit 47 notifies the server 2 that its own mobile terminal 3 has received the unique identification information transmitted from the handling detection target 4 or the localization information transmitted from the other mobile terminal 3. After its own mobile terminal 3 detects the handling detection target 4, the notification transmission unit 48 transmits the localization information corresponding to the detection target 4 to the outside based on the notification information 50.

As described above, in a case where the handling detection target 4 is detected by itself, each of the mobile terminals 3 can transmit the localization information based on the localization information managed by the server 2 instead of the detection target 4.

Figure 6A:
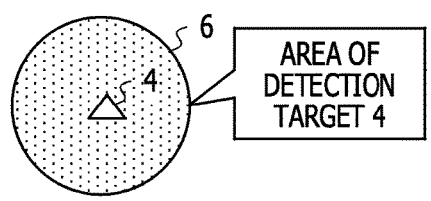
FIGS. 6A 6B, and 6C are conceptual diagrams illustrating a situation where the detection target of which detection is handled by the mobile terminal transmits localization information.
Figure 6B:
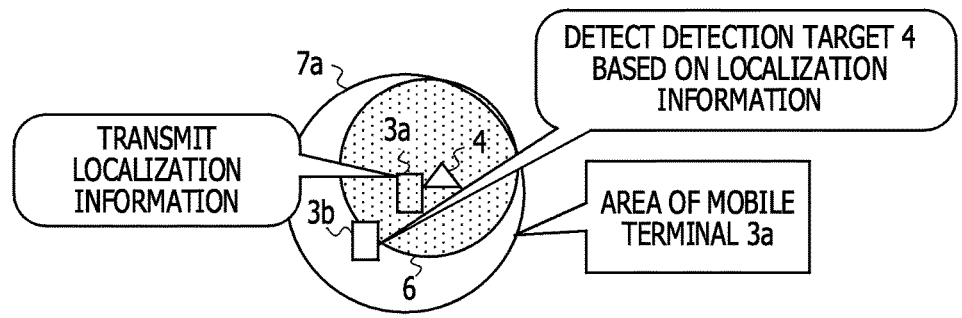
Figure 6C:
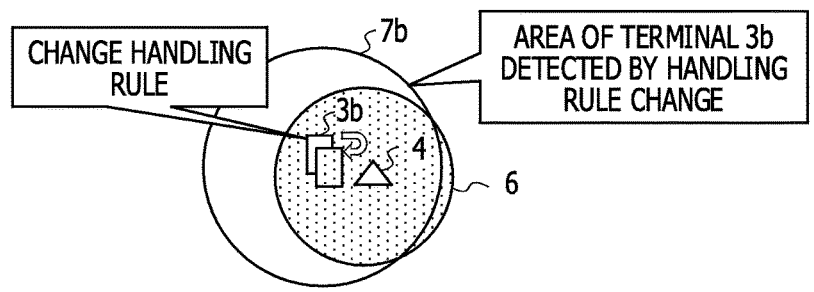

FIGS. 6A 6B, and 6C are conceptual diagrams illustrating a situation where the detection target 4 of which detection is handled by the mobile terminal 3 transmits the localization information.

FIG. 6A is a conceptual diagram of the respective detection targets 4 and the area 6 where the unique identification information transmitted by the respective detection targets 4 can be received. In FIG. 6A, an area of the detection target 4 is denoted by reference sign 6.

FIG. 6B is a conceptual diagram in a case where the mobile terminal 3 enters the area of the detection target 4 handled by the mobile terminal 3. In FIG. 6B, the mobile terminal 3a handles the detection of the detection target 4. The mobile terminal 3b handles the detection except for the detection target 4. When the mobile terminal 3a enters the area 6 of the detection target 4, the mobile terminal 3a detects the detection target 4. After the detection of the detection target 4, the mobile terminal 3a transmits the localization information corresponding to the unique identification information of the detection target 4. An area 7a is an area where the localization information transmitted from the mobile terminal 3a can be received. The mobile terminal 3b is located in the area 7a. The mobile terminal 3b can detect the detection target 4 based on the notification information 50 and the localization information received from the mobile terminal 3a.

FIG. 6C is a conceptual diagram in a case where the mobile terminal 3 that can detect the detection target 4 does not exists in the area 6 of the detection target 4. As described above, the number of pieces of unique identification information that can be registered in the mobile terminal 3 to detect the detection target 4 has a limit. In FIG. 6C, the mobile terminal 3b exists in the area 6 of the detection target 4, but the mobile terminal 3b does not store the unique identification information of the detection target 4 as the handling rule. The server 2 performs handling rule change with respect to the mobile terminal 3b that does not detect any of the detection targets 4. The mobile terminal 3b that becomes able to detect the detection target 4 after the handling rule change detects the detection target 4 in the area 6. After the detection of the detection target 4, the mobile terminal 3b transmits the localization information corresponding to the unique identification information of the detection target 4 in a range of an area 7b. As described above, even in a case where the number of the detection target 4 exceeding the number of pieces of unique identification information that can be registered in the mobile terminal 3 are installed in the identification information obtaining system 1, it is possible to cause the mobile terminal 3 to detect the detection target 4.

Figure 7:
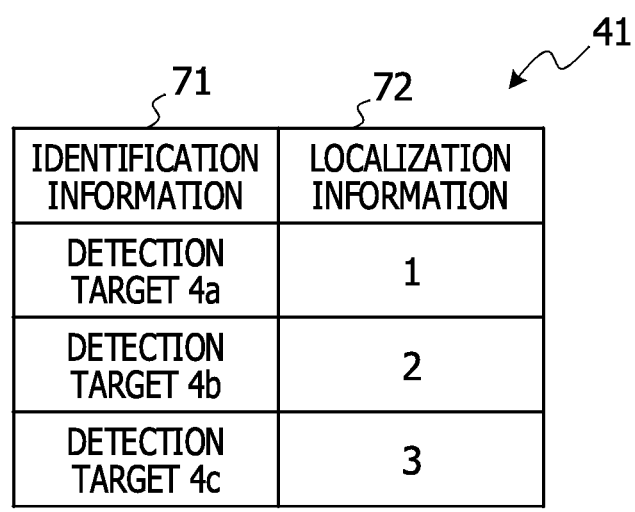
FIG. 7 illustrates a specific example of notification information.

FIG. 7 illustrates a specific example of the notification information 41. In FIG. 7, the notification information 41 includes the identification information 71 and the localization information 72. The identification information 71 is unique identification information of the detection targets 4 installed in respective sites. The localization information 72 is localization information corresponding to the detection targets 4 installed in the respective sites. The server 2 transmits the notification information 41 to the mobile terminal 3 having an access.

Figure 8:
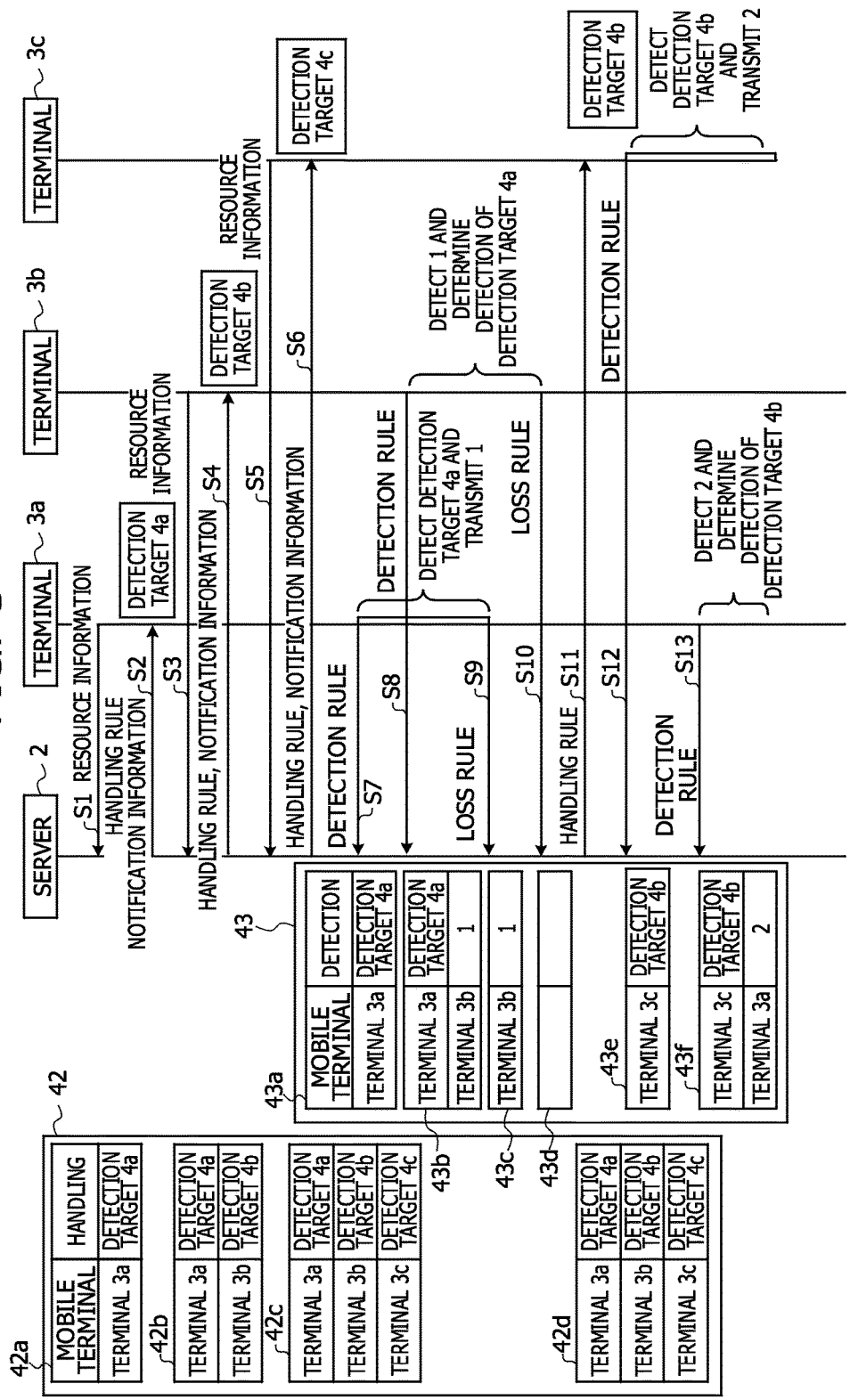
FIG. 8 illustrates sequences between the server and the mobile terminal constituting the identification information obtaining system and specific examples of handling rule allocation information and handling rule ignition information corresponding to the respective sequences.

FIG. 8 illustrates sequences between the server 2 and the mobile terminals 3 constituting the identification information obtaining system 1 and specific examples of the handling rule allocation information 42 and the handling rule ignition information 43 corresponding to the respective sequences. States of changes in the handling rule allocation information 42 and the handling rule ignition information 43 will be described along respective steps in the sequence diagram.

The mobile terminal 3a transmits its own resource information to the server 2 (step S1). As illustrated in a table 42a, the server 2 allocates the detection target 4a to the mobile terminal 3a as the handling rule and also transmits the notification information 41 (step S2).

The mobile terminal 3b transmits its own resource information to the server 2 (step S3). As illustrated in a table 42b, the server 2 allocates the detection target 4b to the mobile terminal 3b as the handling rule and also transmits the notification information 41 (step S4).

The mobile terminal 3c transmits to its own resource information to the server 2 (step S5). As illustrated in a table 42c, the server 2 allocates the detection target 4c to the mobile terminal 3c as the handling rule and also transmits the notification information 41 (step S6). As illustrated in the table 42a, the table 42b, and the table 42c, the allocation information of the detection targets 4 to the respective mobile terminals 3 is recorded in the server 2 as the handling rule allocation information 42. Each of the mobile terminals 3 updates the rule information 49 and the notification information 50 of its own based on the received handling rule and the notification information 41.

When the mobile terminal 3a detects the detection target 4a, the mobile terminal 3a transmits a detection rule for notifying that the detection target 4a is detected to the server 2 based on its own rule information 49 (step S7). As illustrated in a table 43a, the server 2 stores a state in which the mobile terminal 3a detects the detection target 4a as the handling rule ignition information 43. The mobile terminal 3a distributes the localization information "1" based on its own notification information 50 after the mobile terminal 3a notifies the server 2 that the detection target 4a is detected.

When the mobile terminal 3b detects the localization information "1" distributed by the mobile terminal 3a, the mobile terminal 3b transmits the detection rule for performing the notification of the detection to the server 2 (step S8). As illustrated in a table 43b, the server 2 stores the state in which the mobile terminal 3b detects the localization information "1" as the handling rule ignition information 43. The mobile terminal 3b determines that the detection target 4a is detected based on the localization information "1" and the notification information 41.

When the mobile terminal 3a does not detect the detection target 4a any longer due to movement or the like, the mobile terminal 3a transmits a loss rule for notifying that the detection target 4a is lost to the server 2 (step S9). As illustrated in a table 43c, the server 2 deletes the information indicating that the mobile terminal 3a detects the detection target 4a to be stored as the handling rule ignition information 43. When the mobile terminal 3a loses the detection target 4a, the mobile terminal 3a stops the distribution of the localization information "1".

Since the mobile terminal 3b does not receive the identification information any longer due to the transmission stop of the localization information "1" by the mobile terminal 3a, the mobile terminal 3b transmits the loss rule for notifying that the identification information is lost to the server 2 (step S10). As illustrated in a table 43d, the server 2 deletes the information indicating that the mobile terminal 3b detects the localization information "1" to be stored as the handling rule ignition information 43.

In a case where the mobile terminal 3 that does not detect the detection target for a certain period of time exists, the server 2 changes the handling detection target of the mobile terminal 3. Since the mobile terminal 3c does not the detection target for the certain period of time, as illustrated in a table 42d, the detection target 4b is allocated as the handling rule allocation information 42 (step S11). The information illustrated in the table 42d is recorded as the handling rule allocation information 42 in the server 2.

After the handling rule change, the mobile terminal 3c detects the detection target 4b. The mobile terminal 3c transmits the detection rule for notifying that the detection target 4b is detected to the server 2 (step S12). As illustrated in a table 43e, the server 2 records a state in which the mobile terminal 3c detects the detection target 4b as the handling rule ignition information 43 based on the received detection rule. The mobile terminal 3c distributes the localization information "2" based on its own notification information 50.

After the loss of the detection target 4a, the mobile terminal 3a detects the localization information "2" transmitted from the mobile terminal 3c. The mobile terminal 3a transmits the detection rule indicating that the localization information "2" is detected to the server 2 (step S13). As illustrated in a table 43f, the server 2 records a state in which the mobile terminal 3a detects the localization information "2" as the handling rule ignition information 43.

As described above, the identification information obtaining system 1 can cause the mobile terminal 3 to detect the detection target 4 based on the localization information.

Figure 9:
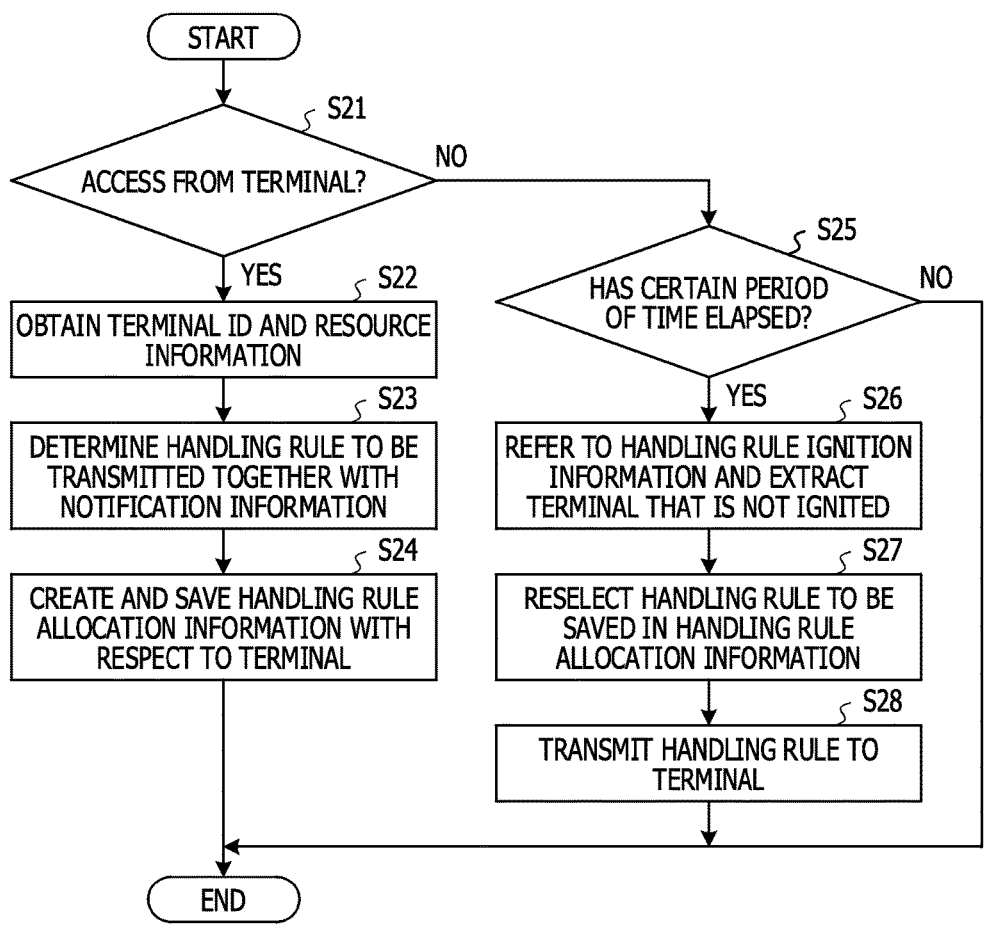
FIG. 9 is a processing flow for the server to allocate handling rules to the respective mobile terminals.

FIG. 9 illustrates a processing flow for the server 2 to allocate the handling rules to the respective mobile terminals 3. The server 2 determines whether or not a reception signal is an access from the mobile terminal 3 (step S21). In a case where the reception signal is the access from the mobile terminal (step S21: YES), the server 2 obtains a terminal ID of the mobile terminal 3 and resource information (step S22). The server 2 determines the handling rule for allocating the detection target 4 as the detection handler of the mobile terminal 3 and transmits the handling rule to the mobile terminal 3 together with the notification information 41 (step S23). The server 2 creates the handling rule allocation information 42 with respect to the respective mobile terminals 3 to be saved in the storage area of the server 2 (step S24).

In a case where the reception signal is not the access from the mobile terminal 3 (step S21: NO), the server 2 determines whether or not a certain period of time has elapsed since the start of the handling rule allocation processing to the mobile terminals 3 (step S25). In a case where the certain period of time has elapsed (step S25: YES), the server 2 refers to the handling rule ignition information 43 and extracts the mobile terminal 3 in which the allocated handling rule is not ignited (step S26). The server 2 reselects the handling rules to be allocated to the respective mobile terminals 3 based on the information of the extracted mobile terminal 3 to be saved in the handling rule allocation information 42 (step S27). The server 2 transmits the handling rules to the respective mobile terminals 3 based on the reselected handling rule allocation information 42 (step S28).

As described above, the server 2 can timely change the detection targets 4 of the detection handlers to be allocated to the respective mobile terminals 3 based on the detection statuses of the detection targets 4 in the respective mobile terminals 3.

Figure 10:
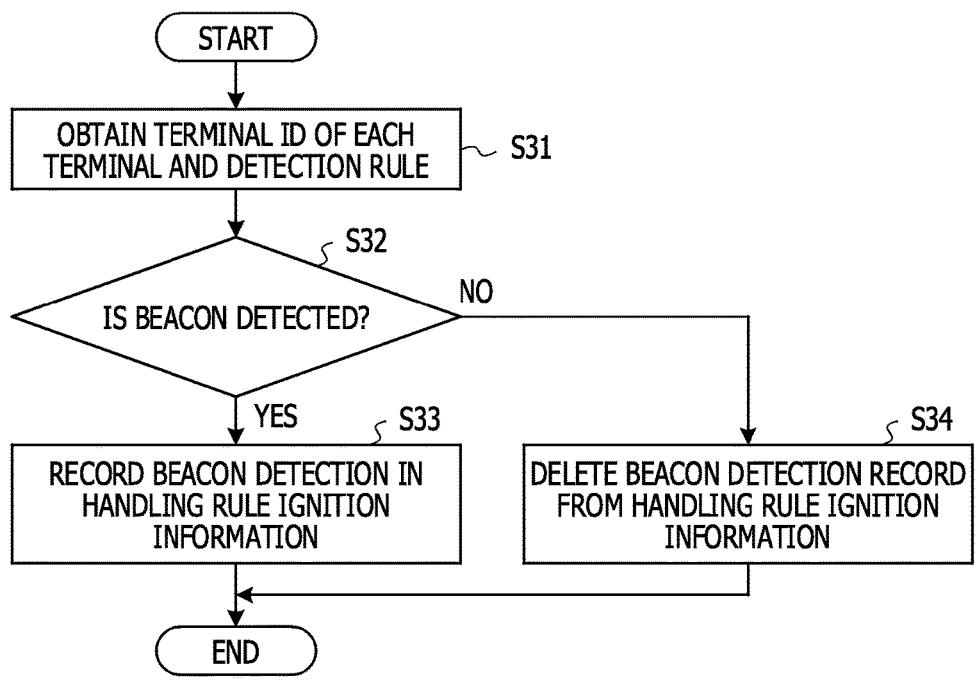
FIG. 10 is a processing flow in the server in a case where the mobile terminal detects the detection target.

FIG. 10 illustrates a processing flow in the server 2 in a case where the mobile terminal 3 detects the detection target 4. The server 2 obtains the terminal ID of each of the mobile terminals 3 and the detection rule (step S31). In a case where the received detection rule is used for notifying that the detection target 4 is detected (step S32: YES), the server 2 records a state in which the mobile terminal 3 detects the detection target 4 in the handling rule ignition information (step S33). In a case where the received detection rule is not used for notifying that the detection target 4 is detected (step S32: NO), the server 2 deletes the record that the mobile terminal 3 detects the detection target 4 from the handling rule ignition information (step S34).

As described above, the server 2 updates the handling rule ignition information based on the detection rule received from the mobile terminal 3.

Figure 11:
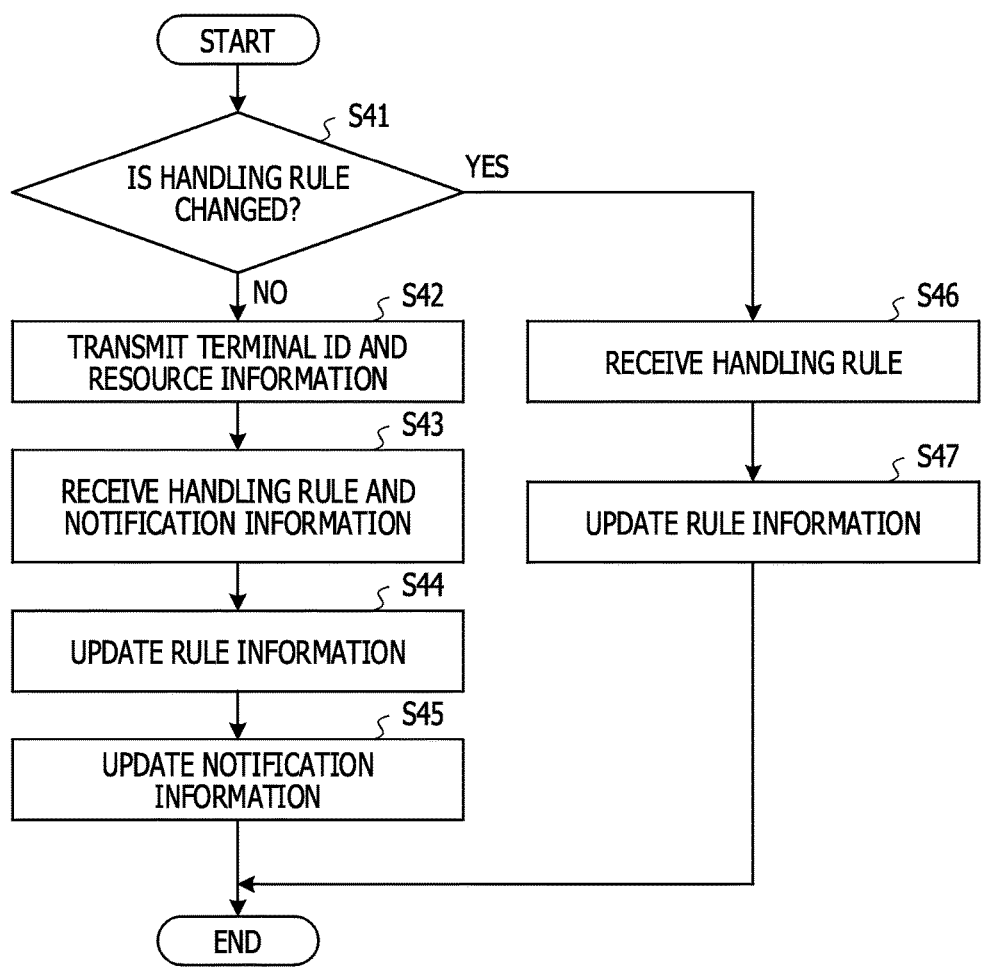
FIG. 11 is a processing flow in the mobile terminal in a case where the handling rules to be allocated to the respective mobile terminals are changed.

FIG. 11 illustrates a processing flow in the mobile terminal 3 in a case where the handling rules allocated to the respective mobile terminals 3 are changed. In a case where the mobile terminal 3 does not receive the change of the handling rule from the server 2 (step S41: NO), for example, the mobile terminal 3 transmits its own terminal ID and the resource information to the server 2 while the entry into the shopping mall or the like is used a trigger (step S42). The mobile terminal 3 receives the handling rule transmitted from the server 2 and the corresponding localization information 41 (step S43). The mobile terminal 3 updates the rule information 49 of the mobile terminal 3 based on the received handling rule and the corresponding localization information 41 (step S44) and also updates the notification information 50 of the mobile terminal 3 (step S45).

In a case where the mobile terminal 3 receives the change of the handling rule from the server 2 (step S41: YES), the mobile terminal 3 receives the new handling rule from the server 2 (step S46). The mobile terminal 3 updates the rule information 49 based on the received handling rule (step S47).

As described above, the mobile terminal 3 can update the rule information and the notification information along with the handling rule allocation change.

Figure 12:
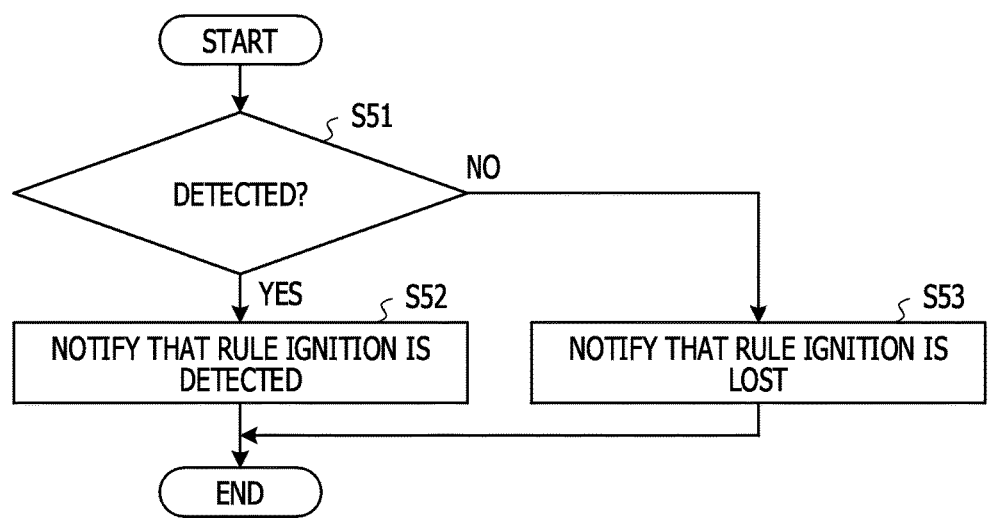
FIG. 12 is a detection processing flow in the mobile terminal of a detection target signal transmitted from the other mobile terminal or the detection target.

FIG. 12 illustrates a detection processing flow for the beacon signal transmitted from the other mobile terminal 3 or the detection target 4 in the mobile terminal 3. The mobile terminal 3 checks the detection status of the beacon signal periodically transmitted from the other mobile terminal 3 or the detection target 4 (step S51). In a case where the mobile terminal 3 detects the beacon signal based on the previously received handling rule 49 (step S51: YES), the mobile terminal 3 transmits the detection rule for notifying that the rule ignition is detected to the server 2 (step S52). On the other hand, in a case where the mobile terminal 3 does not detect the beacon signal based on the previously received rule information 49 (step S51: NO), the mobile terminal 3 transmits the loss rule for the notification of the loss of the rule ignition to the server 2 (step S53). The server 2 can recognize the current position of each of the mobile terminals 3 based on the detection rule or the loss rule received from each of the mobile terminals 3.

Figure 13:
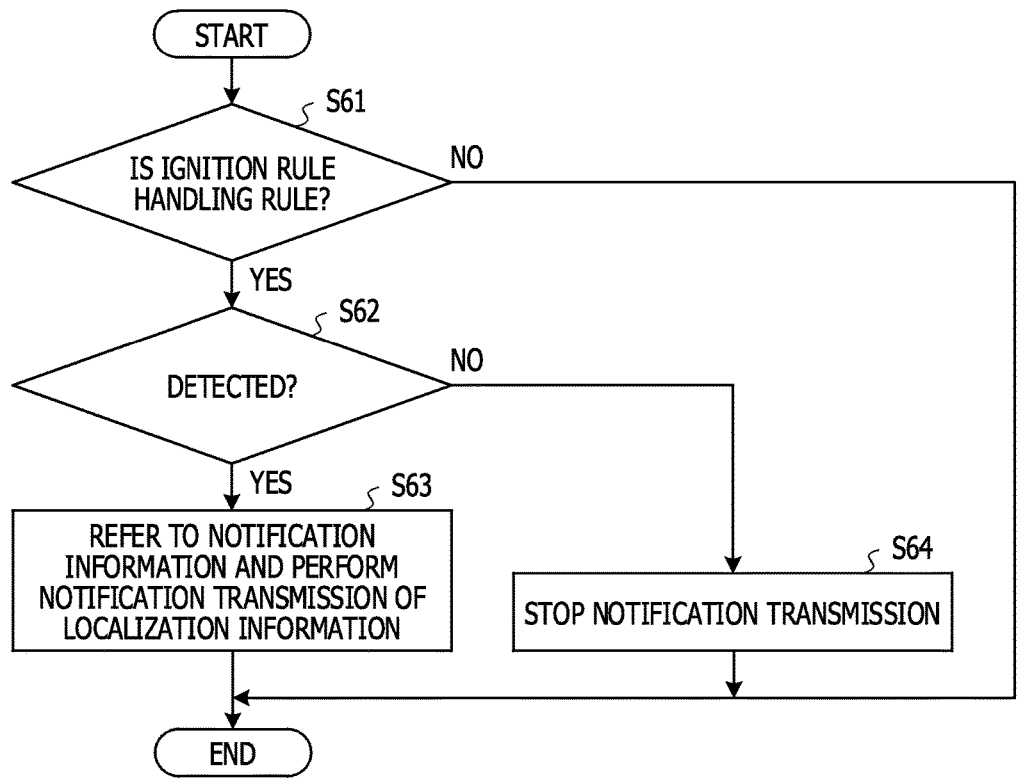
FIG. 13 is a notification processing flow from the mobile terminal after rule ignition.

FIG. 13 illustrates a notification processing flow from the mobile terminal 3 after the rule ignition. The mobile terminal 3 determines whether or not, after the server 2 is notified of the rule ignition by the processing flow of FIG. 12, the ignited rule is the handling rule recorded in the rule information 49 of the mobile terminal 3 (step S61). In a case where the ignition rule is the handling rule (step S61: YES), the mobile terminal 3 determines whether or not the content of the ignition rule is the detection (step S62). In a case where the content of the ignition rule is the detection (step S62: YES), the mobile terminal 3 refers to the notification information 50 of the mobile terminal and performs notification transmission of the localization information recorded in the notification information 50 (step S63). On the other hand, in a case where the ignition rule is not the detection (step S62: NO), the mobile terminal 3 stops the notification transmission of the localization information (step S64). In a case where the ignition rule is not the handling rule (step S61: NO), the mobile terminal 3 does not perform the notification transmission processing of the localization information.

As described above, the mobile terminal 3 can execute the notification transmission processing of the localization information depending on whether or not the ignition rule is the handling rule.

Figure 14:
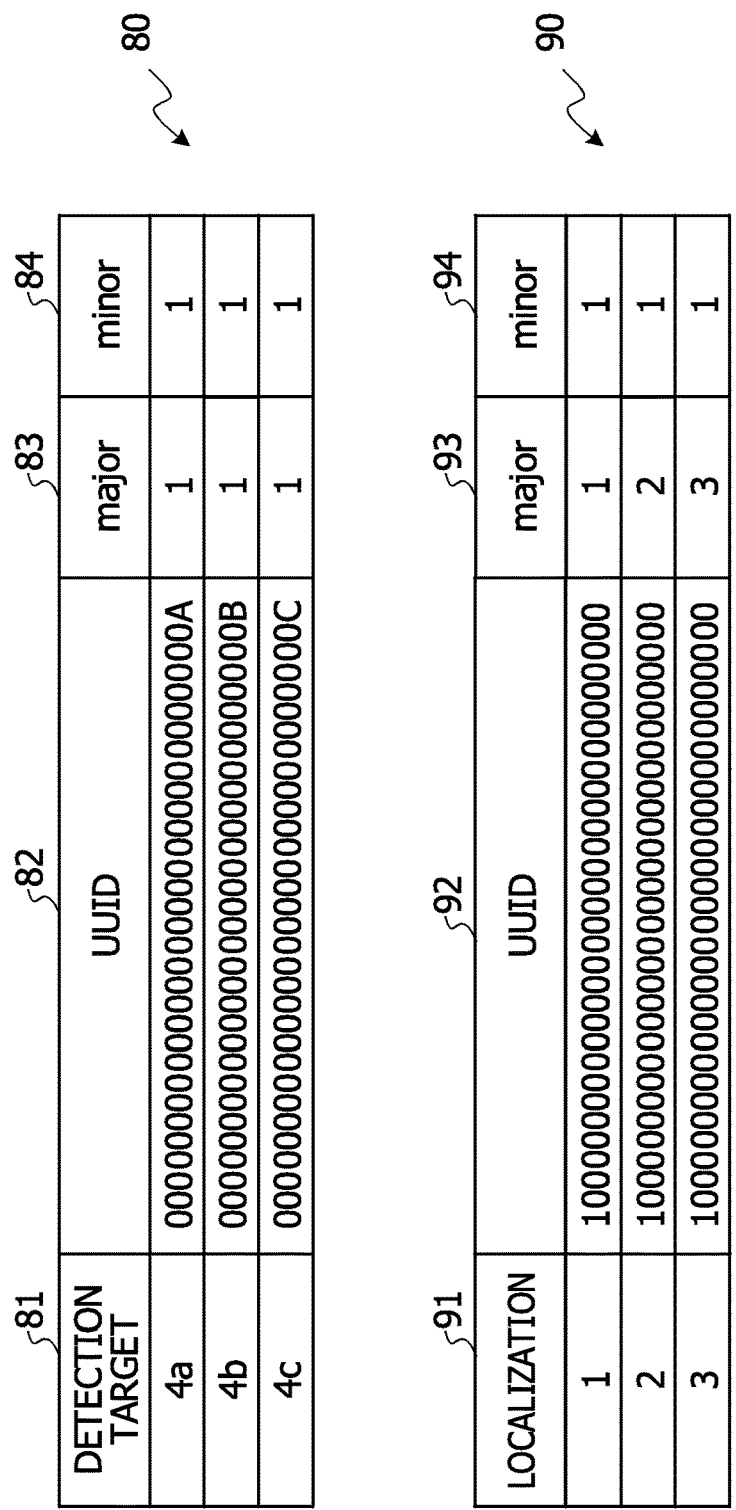
FIG. 14 illustrates a specific example of the notification information.

FIG. 14 illustrates a specific example of the corresponding localization information 41. A table 80 is the unique identification information allocated to the respective detection targets 4. In the table 80, a column 81 corresponds to a reference sign of the detection target 4, a column 82 corresponds to a UUID of the unique identification information, a column 83 corresponds to a major number of the unique identification information, and a column 84 corresponds to a minor number of the unique identification information. When the mobile terminal 3 records the UUID in the column 82 as the rule information 49, the mobile terminal 3 can detect the notification signal of the identification information transmitted from the detection target 4. As indicated in the column 82, since the UUIDs allocated to the detection targets 4 are varied from one another, it is possible to specify the detection target 4 by using only the UUID. The major number and the minor number are preliminary information of the UUID. In the table 80, the major number and the minor number of the detection target 4 are both "1" as indicated in the columns 83 and 84.

A table 90 represents the localization information corresponding to the unique identification information in the table 80. In the table 90, a column 91 corresponds to a localized reference sign, a column 92 corresponds to a UUID of the localization information, a column 93 corresponds to a major number of the localization information, and a column 94 corresponds to a minor number of the localization information. As indicated in the column 92, the UUIDs are all set as the same reference sign in the localization information, and as indicated in the column 93, the major numbers are set as unique numbers. When the mobile terminal 3 stores the localization information in which the UUIDs are set to have the same reference sign as the notification information 41, it is possible to record the identification information of the detection target 4 to be detected without being affected by the limit on the UUIDs that can be stored in the mobile terminal 3.

Second Exemplary Embodiment

Figure 15A:
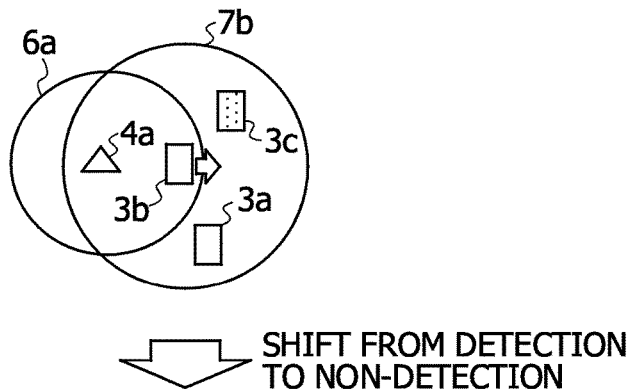
FIGS. 15A, 15B, and 15C illustrate another exemplary embodiment of processing for changing the handling rules allocated to the mobile terminals.
Figure 15B:
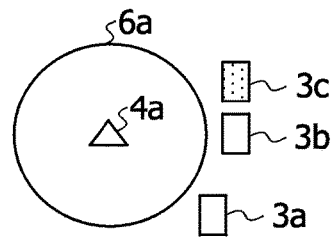
Figure 15C:
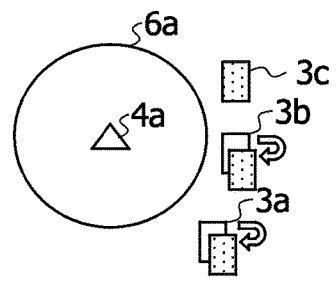

FIGS. 15A, 15B, and 15C illustrate another exemplary embodiment of the processing for changing the handling rule allocated to the mobile terminal 3. In FIG. 15A, the area 6a corresponds to an area of the detection target 4a, and the area 7b corresponds to an area of the mobile terminal 3b. The handling rule for detecting the detection target 4a is allocated to the mobile terminals 3a and 3b, and the handling rule for detecting targets except for the detection target 4a is allocated to the mobile terminal 3c. The mobile terminal 3b transmits the localization information corresponding to the unique identification information of the detection target 4a. Since the mobile terminals 3a and 3c are located within the area 7b, it is possible to determine that the mobile terminals 3a and 3c are close to the detection target 4a. In FIG. 15B, the mobile terminal 3b is located outside the area 6a after the movement. When the mobile terminal 3b leaves the area 6a, the mobile terminal 3b stops the notification of the localization information. The mobile terminal 3b notifies the server 2 that the notification of the localization information is stopped. It is conceivable that the probability that the mobile terminal 3 that once entered the particular detection target 4 or the area of the mobile terminal 3 enters the same area again is low. Therefore, the probability of the detection is increased when the mobile terminal 3 other than the mobile terminal 3 that once entered the particular area handles the detection of the detection target 4 corresponding to the relevant area. In view of the above, the server 2 corrects the handling rule allocation information 42 so as to detect the detection target 4 other than the detection target 4 corresponding to the unique identification information of which the notification is stopped based on the received notification.

In FIG. 15C, the server 2 distributes the handling rules after the change to all the mobile terminals 3 based on the handling rule allocation information 42 after the correction. The mobile terminal 3a and the mobile terminal 3b that have received the handling rule after the change correct the rule information 49 so as to detect the detection target 4 other than the detection target 4a.

As described above, the identification information obtaining system can change the handling rule for detecting the detection targets 4 allocated to the respective mobile terminals 3 while the stop of the identification information notification of the mobile terminal 3 is used as a trigger.

Third Exemplary Embodiment

Figure 16A:
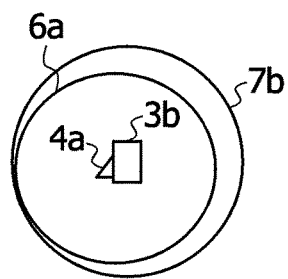
FIGS. 16A and 16B illustrate another exemplary embodiment related to processing for adjusting a radio field intensity when notification of identification information is performed in accordance with a distance from the detection target to the mobile terminal.
Figure 16B:
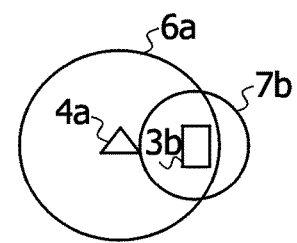

FIGS. 16A and 16B illustrate another exemplary embodiment related to processing for adjusting a radio field intensity when the notification of the identification information is performed in accordance with a distance from the processing the detection target 4 to the mobile terminal 3. FIG. 16A illustrates a size of the area 7b in a case where the distance between the detection target 4a and the mobile terminal 3b is close. FIG. 16B illustrates the size of the area 7b in a case where the distance between the detection target 4a and the mobile terminal 3b is far.

As illustrated in FIG. 16A, in a case where the distance between the detection target 4a and the mobile terminal 3b is close, the mobile terminal 3b transmits the localization information substantially at the same level of the radio field intensity at which the detection target 4b transmits the unique identification information. As a result, the mobile terminal 3b can cover the area 7b corresponding to substantially the same level of the range as the range covered by the area 6a of the detection target 4a.

As illustrated in FIG. 16B, in a case where the distance between the detection target 4a and the mobile terminal 3b is far, the mobile terminal 3b decreases the radio field intensity for transmitting the localization information as the distance from the detection target 4a is farther. When the radio field intensity is decreased in accordance with the distance from the detection target 4a, the mobile terminal 3b can overlap a cover area of the area 7b with a range of the area 6a as much as possible.

As illustrated in FIGS. 16A and 16B, the distance between the detection target 4a and the mobile terminal 3b is to be grasped to adjust the radio field intensity of the mobile terminal 3b in accordance with the distance between the detection target 4a and the mobile terminal 3b. For example, when a Bluetooth (registered trademark) Low Energy (BLE)

specification is implemented, the mobile terminal 3b grasps the distance from the detection target 4a in accordance with the radio field intensity of the signal received from the detection target 4a. The mobile terminal 3b can adjust the radio field intensity when the localization information is transmitted in accordance with the grasped distance from the detection target 4a. When the mobile terminal 3b adjusts the radio field intensity in accordance with the distance from the detection target 4a, a state in which the cover area of the area 7b is largely deviated from a cover area of the area 6a is avoided.

Fourth Exemplary Embodiment

FIGS. 17A and 17B illustrate another exemplary embodiment in a case where the plurality of mobile terminals 3 that can detect the detection target 4 exist in the area of the detection target 4. FIG. 17A illustrates a case where the mobile terminal 3b and the mobile terminal 3c that detect the detection target 4a exist in the area 6a of the detection target 4a. It is noted that an illustration of the detection target 4a that transmits the signal corresponding to the area 6a is omitted in FIGS. 17A and 17B. The mobile terminal 3b and the mobile terminal 3c both store the handling rule for detecting the detection target 4a. When the mobile terminal 3b and the mobile terminal 3c enter the area 6a, the mobile terminal 3b and the mobile terminal 3c detect the detection target 4a and notify the server 2 of the detection of the detection target 4a. After the notification is made to the server 2, the mobile terminal 3b and the mobile terminal 3c respectively transmit the localization information corresponding to the unique identification information of the detection target 4a to the ranges of the area 7b and an area 7c. When the area of the beacon is covered by the areas of the plurality of terminals, the identification information obtaining system can reduce an omission of the cover area which is caused by a deviation between the areas of the beacon and the terminal.

FIG. 17B illustrates a case where the mobile terminal 3b and the mobile terminal 3c that detect the detection target 4a exist in the area 6a of the detection target 4a, and only one of the mobile terminals transmits the localization information. When the mobile terminal 3b and the mobile terminal 3c detect the detection target 4a in the area 6a, the mobile terminal 3b and the mobile terminal 3c transmit the detection rule for performing the notification of the detection to the server 2. When the server 2 receives the notification of the beacon detection from the plurality of mobile terminals 3b and 3c, the server 2 transmits an instruction signal for instructing one of the mobile terminal 3b and the mobile terminal 3c to transmit the localization information. The mobile terminal 3b and the mobile terminal 3c transmit or stop the localization information in accordance with the instruction signal received from the server 2. When the server 2 receives the detection rule for performing the notification of the beacon detection from the mobile terminal 3b and the mobile terminal 3c, the server 2 may receive distance information related to the distances between the respective terminals and the detection target 4a. The server 2 may instruct only the terminal closest to the detection target 4a to transmit the localization information based on the distance information with the detection target 4a received from the terminals. When the identification information obtaining system causes one of the plurality of terminals that detect the beacon to transmit the localization information the localization information, it is possible to reduce the power consumption as a whole of the system. In addition, when the identification information obtaining system causes the terminal closest to the beacon to transmit the localization information, it is possible to reduce the omission of the cover area caused by the deviation between the positions of the beacon and the terminal.

Fifth Exemplary Embodiment

Figure 18A:
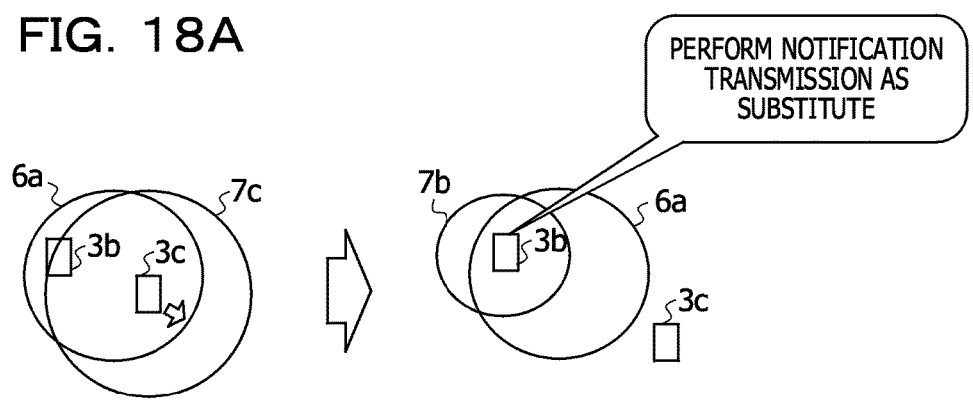
FIGS. 18A and 18B illustrate another exemplary embodiment related to processing in a case where the mobile terminal that transmits the localization information leaves the area of the detection target.
Figure 18B:
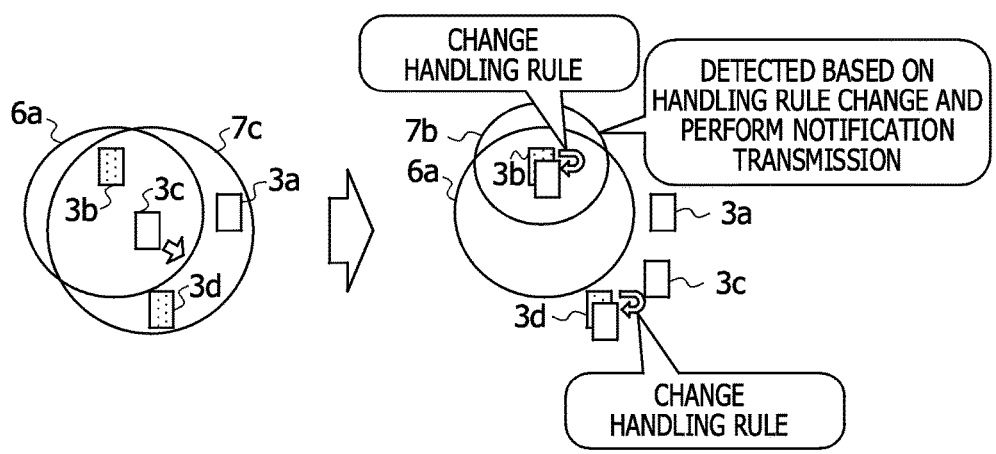

FIGS. 18A and 18B illustrate another exemplary embodiment related to the processing in a case where the mobile terminal 3 that transmits the localization information leaves the area of the detection target 4. FIG. 18A illustrates a case where, after the mobile terminal 3c among the mobile terminal 3b and the mobile terminal 3c that detect the detection target 4a starts the transmission of the localization information, the mobile terminal 3c leaves the area 6a. It is noted that an illustration of the detection target 4a that transmits the unique identification information in the range of the area 6a is omitted in FIGS. 18A and 18B.

In a case where the mobile terminal 3c leaves the area 6a by the movement, the mobile terminal 3c transmits a loss notification signal for notifying that the detection of the detection target 4a is lost to the server 2. The server 2 previously receives a detection notification signal for notifying that the detection target 4a is detected also from the mobile terminal 3b. The server 2 transmits an instruction signal to the mobile terminal 3b so as to transmit the localization information based on the above-mentioned notification information. The mobile terminal 3b that has received the instruction signal starts the transmission of the localization information instead of the mobile terminal 3c. As described above, after the transmission stop of the localization information by one terminal, the identification information obtaining system can promptly resume the transmission of the localization information by the other terminal.

FIG. 18B illustrates a case where the terminal that detects the localization information exists and the terminal that transmits the identification information leaves the area of the beacon. It is noted that, an illustration of the detection target 4a that transmits the unique identification information in the range of the area 6a is omitted in the drawing. The mobile terminal 3c transmits the localization information of the detection target 4a in the area 7c in FIG. 18B. The mobile terminal 3a, the mobile terminal 3b, and the mobile terminal 3d receives the localization information transmitted from the mobile terminal 3c in the area 7c. Although the handling rule is the detection target 4a, since the mobile terminal 3a is outside the area 6a, the mobile terminal 3a can detect the detection target 4a because of the area 7c. On the other hand, the handling rule is allocated to the mobile terminal 3b and the mobile terminal 3d except for the detection target 4a.

In a case where the mobile terminal 3c leaves the area 6a by the movement, the mobile terminal 3c notifies the server 2 that the detection of the detection target 4a is lost. The server 2 recognizes that the mobile terminal 3a, the mobile terminal 3b, and the mobile terminal 3d receive the localization information based on the notification signals from the mobile terminal 3a, the mobile terminal 3b, and the mobile terminal 3d. The server 2 transmits the notification signal for performing the notification of the change of the handling rule so as to set the detection target to be detected as the detection target 4a to the mobile terminal 3b and the mobile terminal 3d that receive the localization information based on the above-mentioned notification information. A reason why the handling rule of the mobile terminal 3b and the mobile terminal 3d is changed to the detection target 4a is because the probability that the terminal that receives the localization information corresponding to the detection target 4a detects the unique identification information of the detection target 4a is high. Although the handling rule is the detection target 4a, the mobile terminal 3a does not become a target of the handling rule change since it is already understood that the detection target 4a is not detected.

The mobile terminal 3b located within the area 6a among the mobile terminal 3b and the mobile terminal 3d in which the handling rule is changed receives the unique identification information of the detection target 4a. The mobile terminal 3b that has received the unique identification information of the detection target 4a transmits the localization information corresponding to the unique identification information of the detection target 4a.

As described above, after the transmission stop of the localization information by one terminal, the identification information obtaining system can promptly resume the transmission of the localization information by the other terminal.

Six Exemplary Embodiment

Figure 19:
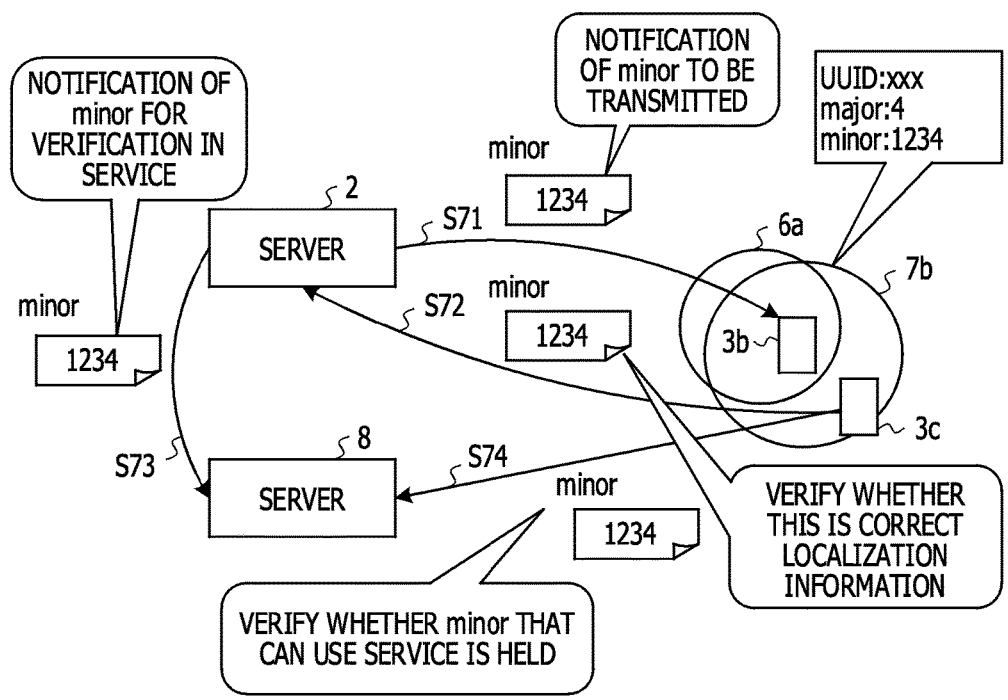
FIG. 19 illustrates authentication processing of the mobile terminal that has received the localization information.

FIG. 19 illustrates authentication processing of the mobile terminal 3 that has received the localization information. In FIG. 19, the identification information obtaining system includes the server 2, a server 8, the detection target 4a, the mobile terminal 3b, and the mobile terminal 3c. It is noted that an illustration of the detection target 4a that transmits the unique identification information in the range of the area 6a is omitted in the drawing.

When the mobile terminal 3b detects the unique identification information of the detection target 4a, the server 2 is notified. The server 2 that has received the notification notifies the mobile terminal 3b of the minor number "1234" to be transmitted as the localization information (step S71). The mobile terminal 3b has received the notification transmits the minor number "1234" as part of the localization information of the detection target 4a.

In a case where the other mobile terminal 3c enters the area 7b of the mobile terminal 3b that transmits the localization information, the mobile terminal 3c transmits the minor number "1234" as part of the localization information received from the mobile terminal 3b to the server 2 (step S72). The server 2 verifies whether or not the minor number for instructing the mobile terminal 3b to perform the transmission is the same as the minor number received from the mobile terminal 3c. In a case where it is possible to confirm that the minor numbers are the same, the server 2 transmits a signal for permitting the reception of the signal transmitted from the mobile terminal 3b to the mobile terminal 3c.

The server 2 transmits the localization information received by the mobile terminal 3c to the other server 8 (step S73). The server 8 may be a server configured to provide the other service to the mobile terminal 3. Since the mobile terminal 3c uses the service provided by the server 8, the mobile terminal 3c transmits the minor number "1234" issued by the server 2 among the localization information to the server 8 (step S74). When the server 8 compares and verifies the minor number previously received from the server 2 and the minor number received from the mobile terminal 3c with each other, it is possible to confirm that the mobile terminal 3c is the terminal that can use the service.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
  an information processing apparatus configured to transmit first rule information indicating that a first detection target is allocated and first notification information for the first detection target including first localization information which is common to a plurality of mobile terminals;
  a first mobile terminal included in the plurality of mobile terminals and including:
  a first memory; and
  a first processor coupled to the first memory and configured to:
    receive the first rule information and the first notification information from the information processing apparatus;
    store the first rule information and the first notification information in the first memory;
    distribute the first localization information to the plurality of mobile terminals other than the first mobile terminal in a case where the first detection target is detected based on the first rule information; and
    transmit, to the information processing apparatus, a first detection signal to notify that the first detection target is detected.

2. The information processing system according to claim 1, further comprising a second mobile terminal which is included in the plurality of mobile terminals, is different from the first mobile terminal, and is configured to:
  receive, from the information processing apparatus, second rule information indicating that a second detection target is allocated and second notification information for the second detection target including second localization information which is common to the plurality of mobile terminals;
  store the second rule information and the second notification information in a second memory;
  distribute the second localization information to the plurality of mobile terminals other than the second mobile terminal in a case where the second detection target is detected based on the second rule information; and
  transmit, to the information processing apparatus, a second detection signal to notify that the second detection target is detected.

3. The information processing system according to claim 2, wherein information processing apparatus includes:
  a third memory configured to store the first rule information, the first notification information, the second rule information and the second notification information; and
  a second processor coupled to the third memory and configured to:
    transmit the first rule information and the first notification information to the first mobile terminal,
    transmit the second rule information and the second notification information to the second mobile terminal, and
    write a detection status into the third memory when receiving the first detection signal or the second detection signal from one of the first mobile terminal and the second mobile terminal.

4. The information processing system according to claim 1, wherein a second mobile terminal included in the plurality of mobile terminals transmits, when receiving the first localization information from the first mobile terminal, a third detection signal to notify that the first localization information is detected to the information processing apparatus.

5. The information processing system according to claim 1, wherein the first processor transmit, to the information processing apparatus, a detection loss signal to notify that the first detection target is not detected when the first processor does not detect the first detection target any longer.

6. An information processing method comprising:
  receiving, by a computer in a first mobile terminal, from information processing apparatus, first rule information indicating that a first detection target is allocated and first notification information for the first detection target including first localization information which is common to a plurality of mobile terminals including the first mobile terminal;
  storing the first rule information and the first notification information in a first memory;
  distributing the first localization information to the plurality of mobile terminals other than the first mobile terminal in a case where the first detection target is detected based on the rule information; and
  transmitting, to the information processing apparatus, a first detection signal to notify that the first detection target is detected.

7. The information processing method according to claim 6, wherein a second mobile terminal which is included in the plurality of mobile terminals, is different from the first mobile terminal and is configured to:
  receive, from the information processing apparatus, second rule information indicating that a second detection target is allocated and second notification information for the second detection target including second localization information which is common to the plurality of mobile terminals;
  store the second rule information and the second notification information in a second memory;
  distribute the second localization information to the plurality of mobile terminals other than the second mobile terminal in a case where the second detection target is detected based on the second rule information; and
  transmit, to the information processing apparatus, a second detection signal to notify that the second detection target is detected.

8. The information processing method according to claim 7, wherein information processing apparatus includes:
  a third memory configured to store the first rule information, the first notification information, the second rule information and the second notification information; and
  a processor coupled to the third memory and configured to:
    transmit the first rule information and the first notification information to the first mobile terminal,
    transmit the second rule information and the second notification information to the second mobile terminal, and
    write a detection status into the third memory when receiving the first detection signal or the second detection signal from one of the first mobile terminal and the second mobile terminal.

9. The information processing method according to claim 6, wherein a second mobile terminal included in the plurality of mobile terminals transmits, when receiving the first localization information from the first mobile terminal, a third detection signal to notify that the first localization information is detected to the information processing apparatus.

10. The information processing method according to claim 6, further comprising:
  transmitting, to the information processing apparatus, a detection loss signal to notify that the first detection target is not detected when the computer does not detect the first detection target any longer.

11. A mobile terminal comprising:
  a first memory; and
  a first processor coupled to the memory and configured to:
    receive, from information processing apparatus, first rule information indicating that a first detection target is allocated and first notification information for the first detection target including first localization information which is common to a plurality of mobile terminals including the mobile terminal,
    store the first rule information and the first notification information in the first memory;
    distribute the first localization information to the plurality of mobile terminals other than the mobile terminal in a case where the first detection target is detected based on the first rule information; and
    transmit, to the information processing apparatus, a first detection signal to notify that the first detection target is detected.

12. The mobile terminal according to claim 11, wherein another mobile terminal which is included in the plurality of mobile terminals, is different from the mobile terminal and is configured to:
  receive, from the information processing apparatus, second rule information indicating that a second detection target is allocated and second notification information for the second detection target including second localization information which is common to the plurality of mobile terminals;
  store the second rule information and the second notification information in a second memory;
  distribute the second localization information to the plurality of mobile terminals other than the another mobile terminal in a case where the second detection target is detected based on the second rule information; and
  transmit, to the information processing apparatus, a second detection signal to notify that the second detection target is detected.

13. The mobile terminal according to claim 12, wherein information processing apparatus includes:
  a third memory configured to store the first rule information, the first notification information, the second rule information and the second notification information; and
  a second processor coupled to the third memory and configured to:
    transmit the first rule information and the first notification information to the mobile terminal,
    transmit the second rule information and the second notification information to the another mobile terminal, and
    write a detection status into the third memory when receiving the first detection signal or the second detection signal from one of the mobile terminal and the another mobile terminal.

14. The mobile terminal according to claim 11, wherein another mobile terminal included in the plurality of mobile terminals transmits, when receiving the first localization information from the mobile terminal, a third detection signal to notify that the first localization information is detected to the information processing apparatus.

15. The mobile terminal according to claim 11, wherein the first processor transmit, to the information processing apparatus, a detection loss signal to notify that the first detection target is not detected when the first processor does not detect the first detection target any longer.

* * * * *